US010906394B2

(12) United States Patent
Witte et al.

(10) Patent No.: US 10,906,394 B2
(45) Date of Patent: Feb. 2, 2021

(54) TANK MODULE

(71) Applicant: Huf Hülsbeck & Fürst GmbH & Co. KG, Velbert (DE)

(72) Inventors: Martin Witte, Ahaus (DE); Igor Gorenzweig, Wuppertal (DE); Christian Löpke, Heiligenhaus (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 0 days.

(21) Appl. No.: 16/332,957

(22) PCT Filed: Jul. 27, 2017

(86) PCT No.: PCT/EP2017/069030
§ 371 (c)(1),
(2) Date: Mar. 13, 2019

(87) PCT Pub. No.: WO2018/050340
PCT Pub. Date: Mar. 22, 2018

(65) Prior Publication Data
US 2019/0225078 A1    Jul. 25, 2019

(30) Foreign Application Priority Data

Sep. 14, 2016   (DE) .................. 10 2016 117 319
Mar. 3, 2017    (DE) .................. 10 2017 104 514

(51) Int. Cl.
*B60K 15/05*     (2006.01)
*B60K 1/00*      (2006.01)

(52) U.S. Cl.
CPC ............ *B60K 15/05* (2013.01); *B60K 1/00* (2013.01); *B60K 2015/053* (2013.01);
(Continued)

(58) Field of Classification Search
CPC ................. B60K 15/05; B60K 2015/0538
(Continued)

(56) References Cited

U.S. PATENT DOCUMENTS

| 6,968,874 B1 | 11/2005 | Gabbey et al. |
| 2005/0115810 A1* | 6/2005 | Spies ............ H01H 21/10 200/61.62 |

(Continued)

FOREIGN PATENT DOCUMENTS

| DE | 4438610 | * 5/1996 |
| DE | 10050558 A1 | 4/2002 |

(Continued)

OTHER PUBLICATIONS

Examination Report for European Application No. 17754088.7 dated Jul. 7, 2020, with its English translation, 9 pages.

*Primary Examiner* — Dennis H Pedder
(74) *Attorney, Agent, or Firm* — Rudy J. Ng; Bret E. Field; Bozicevic, Field & Francis LLP

(57) ABSTRACT

The invention relates to a tank module for a motor vehicle, with a housing in which a recess is provided, wherein a connecting element is arranged in the recess, a protective element for the connecting element, which can be moved between at least two positions, namely: a rest position in which the recess can be closed by the protective element, and an operating position in which the recess can be released by the protective element so that the connecting element is exposed, the protective element having an outer surface, and at least one sensor for detecting an activation action of a user to transfer the protective element between the rest position and the operating position, wherein the protective element is mounted in such a way that the outer surface of the protec- (Continued)

Figure 1:
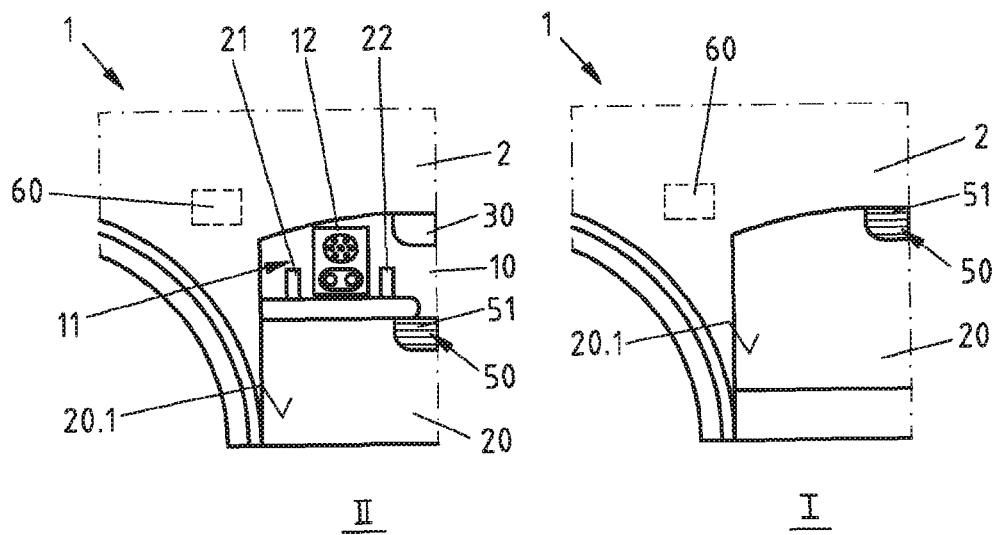

tive element in the rest position and the outer surface of the protective element in the operating position are aligned parallel to one another.

22 Claims, 9 Drawing Sheets

(52) U.S. Cl.
CPC .............. *B60K 2015/0523* (2013.01); *B60K 2015/0538* (2013.01); *B60K 2015/0546* (2013.01); *B60Y 2300/91* (2013.01)

(58) Field of Classification Search
USPC ...................................................... 296/97.22
See application file for complete search history.

(56) References Cited

U.S. PATENT DOCUMENTS

| | | | |
|---|---|---|---|
| 2013/0074411 A1* | 3/2013 | Ferguson | B67D 7/348 49/280 |
| 2015/0151645 A1 | 6/2015 | Yamamaru et al. | |
| 2015/0375630 A1 | 12/2015 | Jeong et al. | |

FOREIGN PATENT DOCUMENTS

| | | |
|---|---|---|
| DE | 102006036456 A1 | 2/2008 |
| DE | 102012021518 A1 | 5/2014 |
| DE | 102015102839 A1 | 10/2015 |

\* cited by examiner

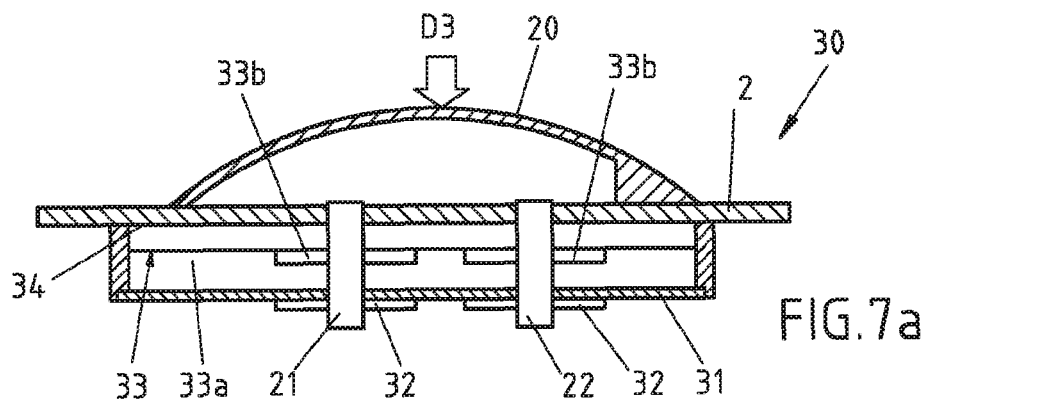
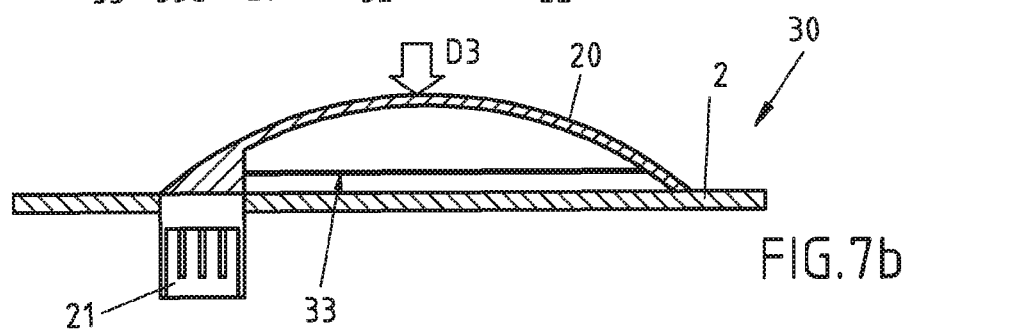
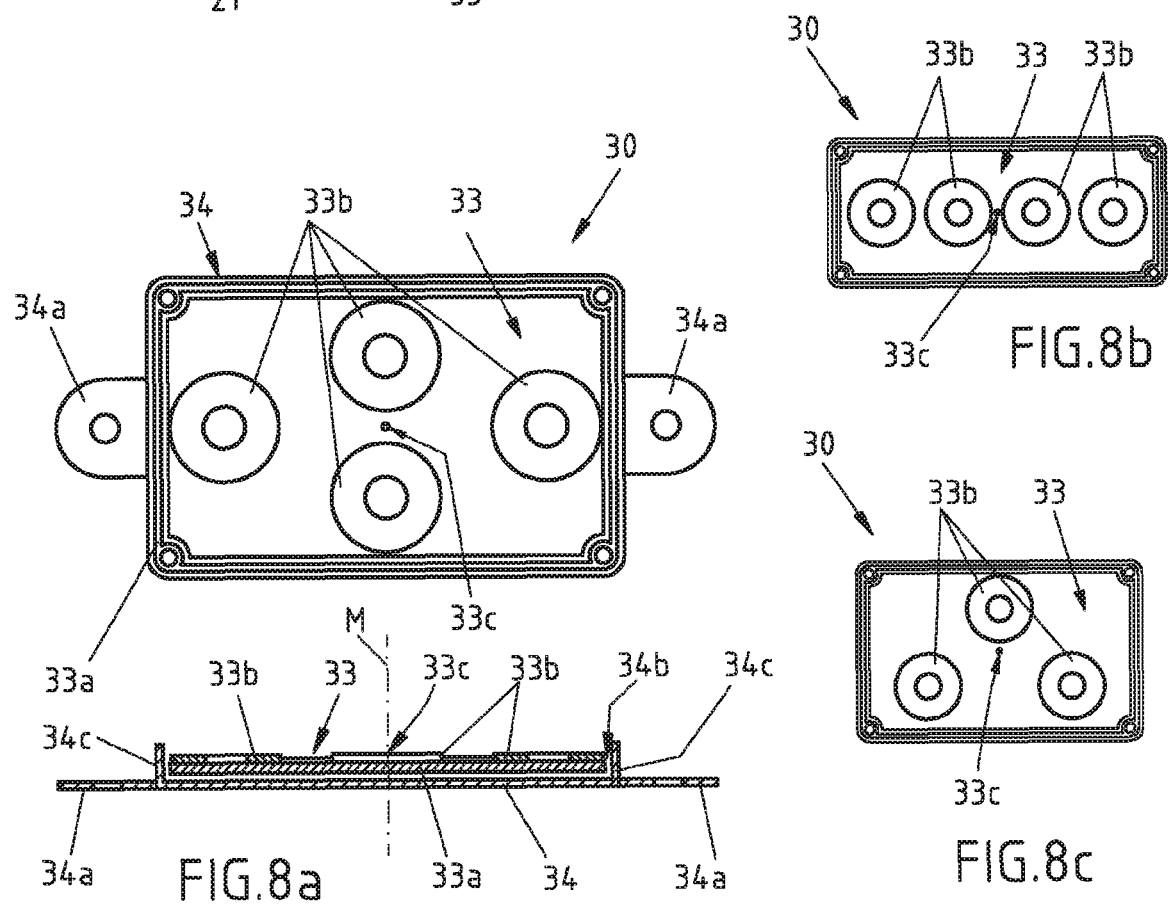

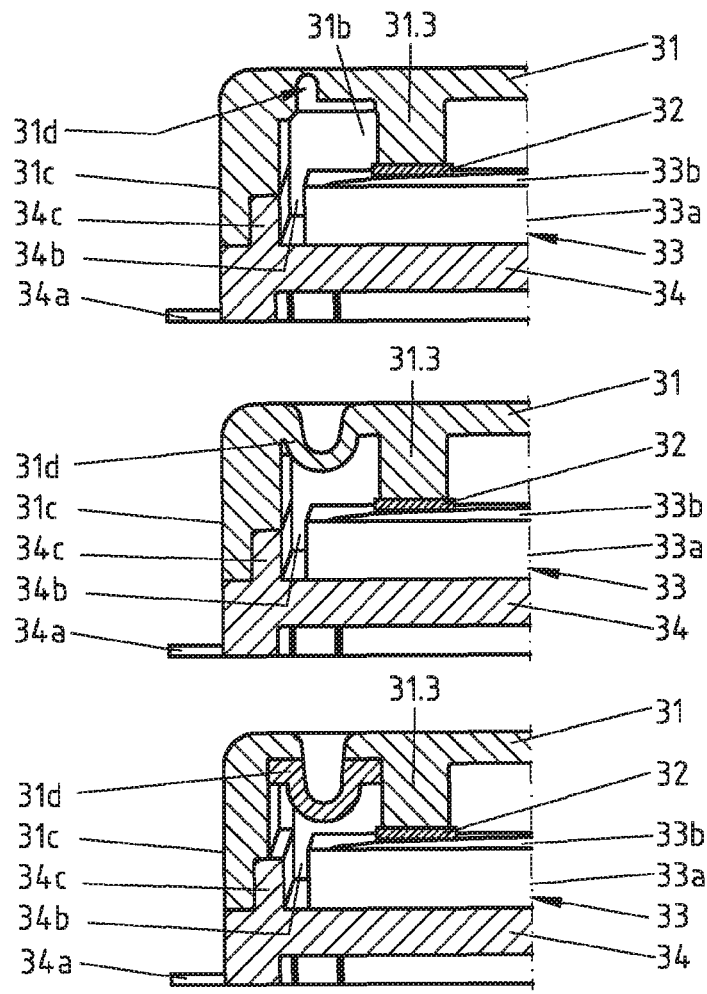
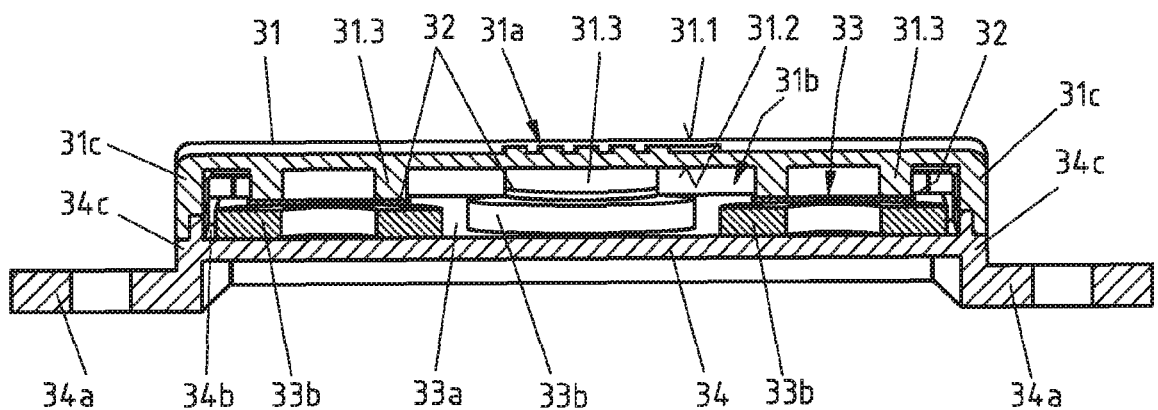
FIG.10

TANK MODULE

The invention relates to a tank module for a motor vehicle, in particular an electric motor vehicle, which has a housing in which a recess is provided, a connecting element, in particular a charging socket, being arranged in the recess, a protective element for the connecting element which is movable between at least two positions, namely: a rest position, in which the recess is closable by the protective element, and an actuating position, in which the recess is releasable by the protective element so that the connecting element is exposed, the protective element having an outer surface, and at least one sensor for detecting an activation action of a user is adapted to transfer the protective element between the rest position and the actuating position. Furthermore, the invention concerns a system with a corresponding tank module and a mobile component, e.g. a charging plug and/or an ID transponder. Furthermore, the invention concerns a procedure for actuating a corresponding tank module.

For example, a well-known tank module for a motor vehicle is known from DE 10 2015 102 839 A1. The tank module has a tail gate that covers a connection element for a charging plug. The tailgate is opened sideways to release the connecting element for loading. In this opened position, the tailgate protrudes from the plane of a vehicle outer shell. However, the protruding tailgate is not vandal-proof. In particular, charging operations for electric motor vehicles which last longer than a normal refueling operation for fueled motor vehicles pose a safety risk.

It is therefore the object of the present invention to improve a tank module of the type mentioned above. In particular, the object of this invention is to provide a safe tank module and to protect the protective element from manipulation of any kind, even during longer loading processes. Furthermore, it is the object of the invention to enable an improved system with a corresponding tank module and a mobile component, in particular a charging plug and/or an ID transponder. It is also the object of the invention to provide an improved method for actuating a corresponding tank module.

This object is solved starting from the tank module according to the present disclosure in connection with the characteristic features. Further advantageous further components of the invention are indicated in the present disclosure.

The invention includes the technical teaching that the protective element is mounted in such a way that the outer surface of the protective element in the rest position and the outer surface of the protective element in the actuating position are aligned parallel to each other. In the rest position, the protective element can be positioned in such a way that the outer surface of the protective element closes the recess essentially parallel to an outer shell of the vehicle. In the actuating position, the protective element can again be positioned so that the outer surfaces of the protective element are arranged parallel to their orientation in the rest position. In other words, the outer surface of the protective element can be positioned parallel to the vehicle outer shell in the actuating position of the protective element.

The idea according to the invention lies in the fact that the outer surface of the protective element or the protective element as a whole is aligned in the rest position and the actuating position and/or moved between the rest position and the actuating position in such a way that the outer surface of the protective element or the protective element itself is aligned substantially parallel to a vehicle outer shell for a loading operation, in particular in the actuating position of the protective element. In other words, the outer surface of the protective element or the protective element as a whole in the actuating position is essentially aligned along the vehicle outer shell. This provides a challenge, sometimes impossible, to manipulate the protective element, e.g. lift it, twist it or even break it off. Consequently, the protective element is reliably protected against manipulation of any kind.

Furthermore, the invention may provide for an actuating area in which the activation action of the user can be detected on the protective element and/or on a vehicle outer shell. Thus, the advantage can be achieved that the activation action of the user can only be detected in a special place, namely the actuating area. Thus, only a deliberate, in particular targeted, activation action can cause the protective element to be transferred between the rest position and the actuating position. Defective and/or unwanted activations of the protective element, e.g. in a car wash by a brush or by a random approach of an object, can thus be reduced, in particular avoided.

The advantage is that the actuating area may have a recognition, preferably in the form of a structuring and/or a marking, in order to make the actuating area visually and/or hepatically recognizable to the user. In this way, the user can be made aware of the actuating area. This allows the operation of the tank module according to the invention to be carried out comfortably, almost intuitively. This increases the user comfort of the tank module according to the invention.

Furthermore, the invention may provide that the actuating area may be in the form of a recess in the protective element or in the outer shell of a vehicle. Thus the advantage can be achieved that an intuitive activation action can be provided to operating the sensor. By directly activating the sensor, both a transfer of the protective element from the rest position to the actuating position and from the actuating position to the rest position can be initiated. In addition, it is conceivable that the actuating area can be made of plastic. By activating the sensor over the actuating area, e.g. by pressing the actuating area, the protective element can be moved from the rest position to the actuating position and by activating the sensor directly, the protective element can be moved from the actuating position to the rest position. An actuating area, whether in the form of a recess or a plastic actuating area, is advantageous because it allows the protective element to be activated in different ways and/or using different technologies. The sensor can be positioned below the recess or below the plastic actuating area. Such an actuating area can advantageously allow the sensor to be designed as an visual sensor, a capacitive sensor, a pressure sensor, an inductive sensor or an NFC sensor. Thus, a variety of design possibilities of the tank module according to the invention can be provided in order to meet different user requirements.

Furthermore, the invention may provide that the actuating area may be in the form of an elastically deformable area in the protective element or in a vehicle outer shell. Thus the advantage can be achieved that a closed system can be provided at least in the rest position of the protective element, which can be protected against external influences and manipulations. A deformable actuating area is advantageous for a sensor which can be designed as a pressure sensor and/or have at least one LDC sensor element. A pressure sensor can be advantageous because pressing is a simple activation action that is easy to perform. A sensor with at least one LDC sensor element can therefore be advantageous to provide a particular detection point for detecting an activation action that can be precisely adjusted. Thus unwanted activations of the protective element can be advantageously reduced, in particular avoided. To transfer the protective element from the rest position to the actuating position, pressing the actuating area can be carried out and to transfer the protective element from the actuating position to the rest position, pressing the sensor can be carried out as an operating action. An LDC sensor element is used to detect at least one change in an inductance, i.e. in particular for inductance measurement. An LDC sensor element normally requires a printed circuit board and a coil. The sensor with an LDC sensor element can simultaneously measure the impedance and the resonance frequency of an LC oscillating circuit. Such a sensor can preferably be stored as a closed system insensitive to external influences such as moisture or contamination. As a result, false detection due to influences such as rain, which can lead to faults in capacitive sensors, for example, can be reliably avoided. A false detection due to external influences which cause a force to be exerted on the protective element or on the actuating area can be avoided, for example, by the fact that only one detection point on the actuating area is specific for the respective activation action. Such a sensor, with at least one LDC sensor element, also has the advantage that it is very sensitive to deformation and can therefore be used very quickly and reliably to detect the activation action. The sensor device has, for example, a resolution below one micrometer with, for example, a bit depth for quantizing the measured inductance values of at least 30 bits or at least 24 bits.

In the context of the invention, it is also conceivable that the sensor may have a deformation area, e.g. in the form of a cap, at which the user's activation action can be detected by deforming the deformation area and/or the actuation area. A deformation area in the form of a cap can be advantageous in order to store the inside of the sensor underneath the cap protected from weather influences. It is also possible that the deformation area can be located at the actuation area and/or at least one bearing position of the protective element. A deformation area at the actuation area, e.g. directly below the actuation area, can be advantageous in order to reliably detect the user's activation action at the actuation area. A deformation area at least one bearing point of the protective element is advantageous, because an intuitive activation action for actuating the sensor can be provided. By pressing the protective element, both a transfer of the protective element from the rest position to the actuating position and from the actuating position to the rest position can be initiated.

Furthermore, the invention may provide that the deformation area may have a visual and/or haptic display element on an outer side facing the actuating area. Thus, the advantage can be achieved that the outside of the deformation area facing the actuation area can display important information for the user, e.g. regarding the correct use of the sensor. Nevertheless, it is conceivable that the outside of the deformation area facing the actuation area can be used as an advertising space, e.g. for a manufacturer's emblem.

Furthermore, a folding element, which revolves circumferentially can be formed on an outer side of the deformation area facing the actuation area in order to allow deformation of the deformation area. It is conceivable that the folding element can be designed as a membrane, in particular a thin-walled membrane, preferably in the form of a bellows, which can be attached around the deformation area, e.g. integrally formed. Thus, the actuating area can be deformed flexibly, e.g. pressed in, by compressing the folding element. A further advantage of the folding element is that the deformation area can be reliably transferred to the original position after deformation, in which the folding element relaxes again after compression. It is also possible that the folding element can be made of an elastic material, e.g. plastic, preferably with a lower viscosity than the material of the deformation area. It is conceivable that the folding element can form a 2K component with the deformation area. The advantage of a folding element with a lower viscosity, i.e. a softer folding element than other deformation areas, can be that the folding element can be compressed with less force. Thus the deformation of the deformation area and the actuation of the sensor can be facilitated.

Furthermore, the invention may provide that the sensor may have at least one activation means, in particular an inductive, preferably elastically deformable one. Furthermore, it is conceivable that the at least one activation means can be designed as an electrically conductive film, coating or element, e.g. made of metal, preferably completely galvanically isolated. The at least one activation means may be arranged particularly preferably (e.g. exclusively) on the deformation area and in particular may be detachably or non-detachably attached in such a way that a deformation of the deformation area and/or of the actuating area, which may lie directly above the deformation area, may have a direct effect on the operating agent. This enables the capitalization activity to be reliably recorded. Within the scope of the invention it is conceivable, for example, that the activation means can be arranged as a metal film or other electrically conductive film on the inside of the deformation area. It may also be possible that the activation agent may be a chromium coating on an inner side of the deformation area. The at least one activation means can also be completely electrically isolated, i.e. galvanically isolated and/or not electrically connected to any electronics of the sensor. The at least one activation agent can be moved relative to a detection area when deforming the deformation area and/or the actuation area. A movable, electrically conductive element, such as the activation agent, can generate an inductive signal that can be detected in the detection area. This means that the activation action can be documented in an inductive way. An inductive detection of the activation action is very precise with regard to a local resolution at the deformation area and/or at the actuating area.

This can have the advantage that the error susceptibility of the sensor can be greatly reduced and thus a more reliable detection of the activation action can be enabled. Such an inductive detection of the activation action is also very sensitive and requires less force to deform the actuating area and/or the deformation area. This can increase the ease of use of the tank module.

In addition, the deformation area on an inner side facing away from the actuating area may have a recess for the at least one activating means, wherein in particular the recess can be surrounded by a collar element. Thus a kind of cap can be created in or below which the operating agent can be positioned in a protected way during operation of the sensor. At the same time, if the deformation area and/or the actuation area is deformed, the activation agent can be moved with the inside of the deformation area to generate an inductive signal.

Within the scope of the invention, it is also conceivable that a circumferentially circumferential taper may be provided in the recess, in particular adjoining the collar element, in order to allow deformation of the deformation area. The taper can be in the form of a groove or notch on the circumference of the recess and advantageously ensure that the deformation area can be elastically deformed on the circumference. The elastic deformation can cause at least one activation element to be moved when deforming the deformation area, especially relative to a detection area. Thus, the activation agent can generate an inductive signal which can be detected in the detection area.

Furthermore, it may be provided within the scope of the invention that the deformation area on an inner side facing away from the actuating area, in particular in the recess, may have a fastening means, in particular in the form of a ram, for the at least one activation means may have in order to fasten the at least one activation means to the deformation area in a form- and/or force- and/or material-locking manner. A fastener, in particular in the form of a ram, may be advantageous for forming the activation means thereon and/or for winding the ram and/or for adhering to an outer surface of the ram and/or for spraying to the ram. Thus, the activation agent can be attached to the deformation area with little effort. The manufacturing costs of the sensor can thus be reduced.

Furthermore, the invention may provide for the sensor to have a detection area in which a deformation of the actuation area and/or the deformation area can be detected, preferably by inductance measurement. The detection area can detect a deformation of the actuating area and/or the deformation area by a relative movement of the activation agent. It is not necessary for the activation agent to contact the detection area directly by touching it, because no contacts need to be closed during an inductance measurement. Thus a high-resolution detection of a deformation of the actuation area and/or the deformation area can be provided.

Furthermore, the detection area may include at least one circuit board and/or at least one, preferably a plurality of, LDC sensor elements. The at least one, preferably several LDC sensor elements can be designed in the form of flat spirals which can be connected to both sides of the circuit board. An inductive feedback signal can be triggered in the spirals by a movable, electrically conductive element. Such LDC sensor elements can detect a relative movement of a conductive element, such as the activation element, in high resolution. Thus, a sensitive capture of the activation action can be provided. The activation action can be that the user can touch the actuating area and/or the deformation area. Touching the actuation area and/or the deformation area can cause deformation of the actuation area and/or the deformation area, albeit very slight, which can cause relative movement of the activation medium to the detection area and can in turn be detected with high resolution in the detection area. By using several LDC sensor elements, the detection point at the actuating area can be set very precisely. This can greatly reduce the error susceptibility of the sensor.

Within the scope of the invention, it is conceivable that a plurality of LDC sensor elements can be arranged symmetrically about a detection point in such a way that a deformation of the actuating area and/or the deformation area can only be detected at the detection point. It is conceivable that the detection point at the detection area can be assigned a corresponding detection point at the deformation area and/or at the actuating area. The detection point at the detection area can be arranged symmetrically between several LDC sensor elements to ensure that only a targeted and conscious activation action can be detected. Thus, the sensor can be precisely adjusted to avoid false triggers, e.g. by washing brushes in a car wash and/or by objects accidentally approaching the sensor. It is conceivable that three or four LDC sensor elements can be arranged symmetrically around a detection point, e.g. offset by an angle on a circle and/or at the corners of a triangle or quadrilateral. It is also conceivable that, for example, two or four LDC sensor elements can be arranged in a row, whereby a detection point can be determined symmetrically in the middle between the LDC sensor elements.

In addition, it is conceivable that the detection area may have a capacitive area in order to first detect a user or user hand approach in a capacitive manner. Then the sensor, in particular the at least one LDC sensor element, can be interrogated to verify the capacitive detection in order to distinguish a conscious activation action from a random actuation of the sensor. Thus, incorrect transfers of the protective element from the rest position to the actuating position can almost be avoided.

The sensor may also have a fastening area for fastening the sensor to the housing. With the aid of the mounting area, the sensor can advantageously be mounted as an independent component on the tank module, especially on the housing. In addition, it is conceivable that the fastening area is being fastened in a form- and/or force- and/or material-locking manner bonded to the housing. Thus a detachable or non-detachable attachment of the sensor to the housing can be achieved, which can be achieved with favorable means.

Furthermore, the fastening area may have a recess for the detection area, the recess in particular being surrounded by a rim element. Thus, a kind of box can be created in which the detection area can be positioned protected.

Furthermore, it is conceivable in the context of the invention that the collar element on the fastening area and the rim element on the fastening area can be designed complementary to one another, in particular with corresponding latching elements, and/or can be fastened in a form- and/or force-locking manner non-positively to one another, so that the at least one activation means and the detection area can be arranged protected between the deformation area and the fastening area. Thus, the advantage can be achieved that the sensor can be designed as a self-contained component, which can be advantageously insensitive to weather influences.

In addition, a further sensor may be provided within the scope of the invention, the further sensor in particular being designed as an visual sensor, a capacitive sensor, a pressure sensor, an inductive sensor or an NFC sensor or comprising at least one LDC sensor element. The other sensor can be used to verify the measurement results of the sensor. It is also conceivable that the additional sensor can communicate with a mobile component, e.g. a charging plug and/or an ID transponder, in order to automatically start a refueling process after the protective element has been opened and/or an authentication query before the protective element has been opened. Thus the functionality of the tank module can be extended.

Furthermore, the invention may provide a drive device for the protective element, the drive device may comprise a motor and/or a gear, in particular a self-locking gear, in order to provide the driving action for the protective element. Thus, after the recording of an activation action of a user and, if necessary, after a verification of the activation action and/or a check of an authorization of the user, an automatic transfer of the protective element between the rest position and the actuating position can be initiated. A self-locking gear unit can have the advantage that the protective element can be protected against the effects of forces and shocks, especially in the actuating position.

Furthermore, it is conceivable that the gear may have a worm wheel and/or a cog wheel. A worm wheel can advantageously interact with a worm on a drive shaft and enable a self-locking gear, e.g. with a high transmission ratio, in particular reduction ratio. Such a gear enables a stable transmission of high drive forces. A gear wheel can provide another gear ratio, in particular a reduction ratio. Thus, a relatively fast rotation of the drive shaft can result in a relatively small working travel when the protective element is transferred from the rest position to the actuating position, on which the protective element can be guided stably and reliably. Such a tank module can thus be reliably in operation.

In addition, the drive device may have a lever mechanism to transmit the driving action to the protective element. A lever mechanism may be advantageous to enable not only a pure pivoting movement or a pure linear movement, but also such a mixed movement of the protective element, at the end of which the outer surface of the protective element or the protective element itself may be arranged substantially parallel to a vehicle outer shell. In a position parallel to the vehicle shell, the protective element is less susceptible to tampering.

Within invention, it may also be provided that the designed lever mechanism is designed as four-joint lever mechanism. Thus, the advantage can be achieved that a composite movement of the protective element can be provided at least partially rotatable, e.g. around an edge of the housing at the edge of the recess, and at least partially linearly movable, substantially along the vehicle outer shell. A four-joint lever mechanism can also allow relatively flush movement of the protective element to the vehicle shell when the protective element is transferred between the rest position and the actuating position, so that in none of the positions of the protective element between the rest position and the actuating position does the protective element protrude far from the vehicle shell and thus become susceptible to manipulation.

The lever mechanism may be designed in such way that during the movement between the rest position and the operating position in a first movement phase, the protective element can be moved rotatably outwards with respect to the recess in the housing and in a second movement phase, said protective element can be substantially parallel to the outer shell of the vehicle. The advantage of the first movement phase is that the size of the image can be reduced. Thus, the tank module according to the invention can require little installation space at the motor vehicle. The advantage of the second movement phase is that the protective element can essentially move parallel to the vehicle outer shell without protruding dangerously far from the vehicle outer shell.

In the context of the invention, it is also possible that the drive device may have a lever mechanism to transmit the driving action to the protective element, in particular the lever mechanism may have a crank which may be rotatably connected to the protective element to drive the protective element. Thus, a simple lever mechanism can be provided for the protective element.

It is also conceivable in the context of the invention that the lever mechanism may be designed in such way that during the movement between the rest position and the operating position in a first movement phase, the protective element can be moved rotatably outwards with respect to the recess in the housing and in a second movement phase, said protective element can be substantially parallel to the outer shell of the vehicle. This allows the advantage to be achieved that the protective element in the actuating position can be inaccessible from the outside, protected inside the recess, especially behind the vehicle shell. Thus, the protective element can be reliably protected against any manipulation.

Furthermore, the drive device may comprise a second lever mechanism for stabilizing the movement of the protective element, wherein in particular the second lever mechanism may comprise at least one pivotally mounted, e.g. curved, lever pivotably mounted to the housing, which may be rotatably connected to the protective element in order to at least partially determine the movement of the protective element. The second lever mechanism is advantageously passive, i.e. no drive effect is transmitted via the second lever mechanism. The advantage of the second lever mechanism is that it can co-determine the movement of the protective element and thus stabilize it. An arched lever is advantageous to allow movement of the protective element around an edge of the housing at the edge of the recess without colliding with the edge.

In addition, a drain can be provided in the housing to drain moisture, e.g. rainwater, from the housing. The drain can lead to the outside. The advantage here is that during a charging process, even a long one, when the protective element releases the recess, any moisture that may get into the recess can be safely removed without impairing the function of the components of the tank module.

Furthermore, the object according to the invention is solved by a system which is provided with a tank module for a motor vehicle, in particular as described above, the tank module having a housing in which a recess is provided, a connecting element, in particular a charging socket, being arranged in the recess, a protective element for the connecting element which is movable between at least two positions, namely: a rest position, in which the recess can be closed by the protective element, and an actuating position, in which the recess can be released by the protective element so that the connecting element is exposed, and at least one sensor is configured for detecting an activation action of a user in order to transfer the protective element between the rest position and the actuating position, and a mobile component, the mobile component having an activation element which interacts with the sensor and/or a further sensor in order to drive the protective element without contact or to initiate a function.

The system according to the invention offers the advantage of an intelligent, interactive system with a tank module and a mobile component. A charging plug for the connection element and/or an ID transponder are conceivable as a mobile component. A detection of an activation action at the sensor can advantageously cause the protective element to be actuated. In addition, with the aid of the mobile component, by interaction of the activation element with the same or at least one further sensor on the tank module, at least one further function, in addition to actuating the protective element, can be triggered with the aid of the mobile component, which function can be carried out before the protective element is actuated, e.g. an ID query, and/or thereafter, e.g. a payment transaction. Nevertheless, it is also conceivable that the activation element can interact with the sensor in order to drive the protective element without contact, e.g. by approaching the activation element to the sensor.

Furthermore, it is conceivable that an NFC tag can be provided on the charging plug as an activation element, preferably with an area of 0 to 5 cm, particularly preferred with an area of 0 to 2 cm, preferably in contact with the sensor and/or another sensor. The advantage can be achieved that with the help of the NFC tag, e.g. over short distances or touched, payments can be made for the loading process.

For security reasons, it is important that the NFC tag has a relatively short area or functions touched to avoid remote access. It is conceivable that the NFC tag can be designed as a RIFD transponder and can interact with a sensor or another sensor on the tank module, e.g. in the form of an active RIFD transponder. For contactless interaction with the active RIFD transponder on the tank module, the NFC tag on the charging plug can be passive. The NFC tag on the charging plug can also be actively configured for a contact-based interaction with the active RIFD transponder on the tank module.

Furthermore, according to the invention the object is solved by a method for actuating a tank module for a motor vehicle, in particular as described above, wherein the tank module has a housing in which a recess is provided, wherein a connecting element, in particular a charging socket, is arranged in the recess, a protective element for the connecting element which is movable between at least two positions, namely: a rest position, in which the recess can be closed by the protective element, and an actuating position, in which the recess can be released by the protective element so that the connecting element is exposed, and at least one sensor for detecting an activation action of a user in order to transfer the protective element between the rest position and the actuating position, the protective element being driven in such a way that the outer surface of the protective element in the rest position and the outer surface of the protective element in the actuating position are aligned parallel to one another. By means of the inventive method, the same advantages are achieved as described above for the inventive tank module and/or the inventive system. In order to avoid repetitions, full reference is made to it in this document.

Further measures to improve the invention are described below together with the description of a preferred example of the invention using the figures. It shows FIG. 1-a schematic representation of a first embodiment of a tank module according to invention, FIG. 2-a schematic representation of a second embodiment of the tank module according to the invention, FIG. 3-a schematic representation of a third embodiment of a tank module according to the invention, FIG. 4-a schematic representation of a fourth embodiment of a tank module according to the invention, FIG. 5-a schematic representation of a sensor according to a configuration of the sensor, FIG. 6-a schematic representation of a sensor according to a further embodiment of the sensor, FIG. 7a-a schematic representation of a sensor according to another embodiment of the sensor, FIG. 7b-a schematic representation of a sensor according to a further embodiment of the sensor, FIG. 8a-a schematic representation of the sensor according to FIG. 5 or 6, FIG. 8b-a schematic representation of the sensor according to another embodiment, FIG. 8c-a schematic representation of the sensor according to another embodiment, FIG. 9-a sectional view of the sensor according to FIG. 5 or 6, FIG. 10-a sectional view of the sensor according to FIG. 5 or 6, FIG. 11-a schematic representation of a drive device according to an embodiment, FIG. 12-a schematic representation of a drive device according to a further embodiment, FIG. 13- schematic representation of a system conforming to an invention in accordance with an embodiment, and FIG. 14- schematic representation of the system conforming to the invention in accordance with another embodiment.

In the following figures, the identical reference signs are used for the same technical characteristics, even for different execution embodiments.

FIGS. 1 to 4 show a tank module 1 as invented for a motor vehicle, in particular an electric vehicle, which is configured with a housing 10. The housing 10 can be configured as a mounting element or a mounting aid for the tank module 1 on the motor vehicle. A recess 11 is provided in the housing 10, in which a connecting element 12, e.g. in the form of a charging socket 12, is arranged. The charging socket 12 is intended for charging a battery of the motor vehicle, in particular a traction battery of the electric vehicle. Alternatively, however, it is possible that in a fuel-driven motor vehicle the connecting element 12 can be designed as a filler tube. A protective element 20 is provided for closing the recess 11 and is movable between at least two positions I, II, namely: a rest position I, in which the recess 11 is closable by the protective element 20 (right in FIGS. 1 to 4), and an actuating position II, in which the recess 11 is releasable by the protective element 20 so that the connecting element 12 is exposed (left in FIGS. 1 to 4). The protective element 20 is configured with an outer surface 20.1 and mounted in such a way that the outer surface 20.1 of the protective element 20 is aligned parallel to each other in the rest position I and the outer surface 20.1 of the protective element 20 in the actuating position II. Furthermore, the tank module 1 according to the invention has at least one sensor 30 for detecting an activation action of a user in order to transfer the protective element 20 between the rest position I and the actuating position II. In addition, a further sensor 60 can be provided on tank module 1, which can be configured for a further function, e.g. for an ID query or a payment process.

The outer surface 20.1 is positioned in the rest position I of the protective element 20 in such a way that the outer surface 20.1 of the protective element 20 closes the recess 11 essentially parallel to a vehicle outer shell 2. In actuating position II, the protective element 20 can again be positioned in such a way that the outer surface 20.1 of the protective element 20 is arranged parallel to its alignment in the rest position I of the protective element 20. In other words, the outer surface 20.1 of the protective element 20 can be positioned parallel to the vehicle outer shell 2 both in the actuating position II and in the rest position I of the protective element 20. Advantageously, the protective element 20 is reliably protected against manipulation of any kind by positioning the outer surface 20.1 in this way, whereby it becomes difficult, sometimes impossible, to manipulate the protective element 20, be it to lift it, to twist it or even to break it off.

Figure 2:
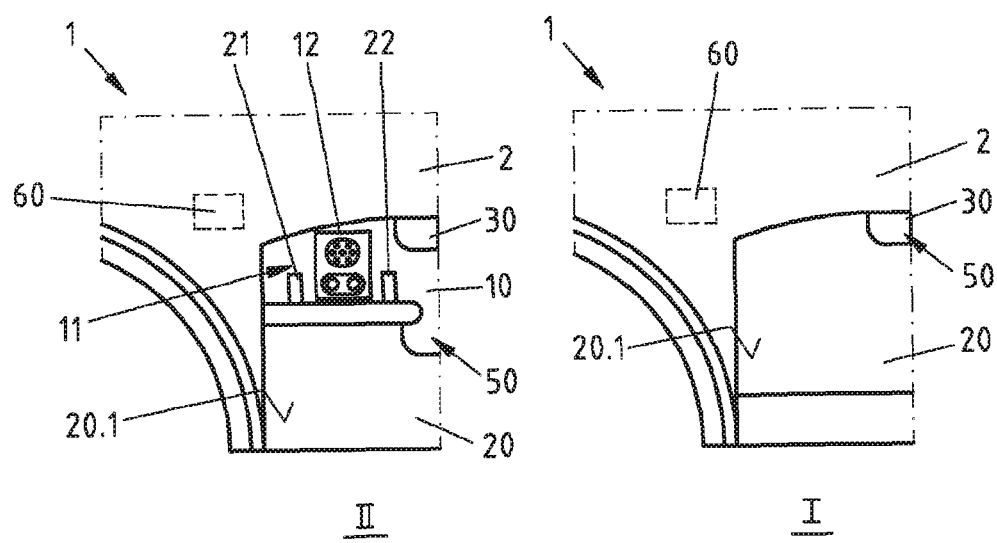
Figure 3:
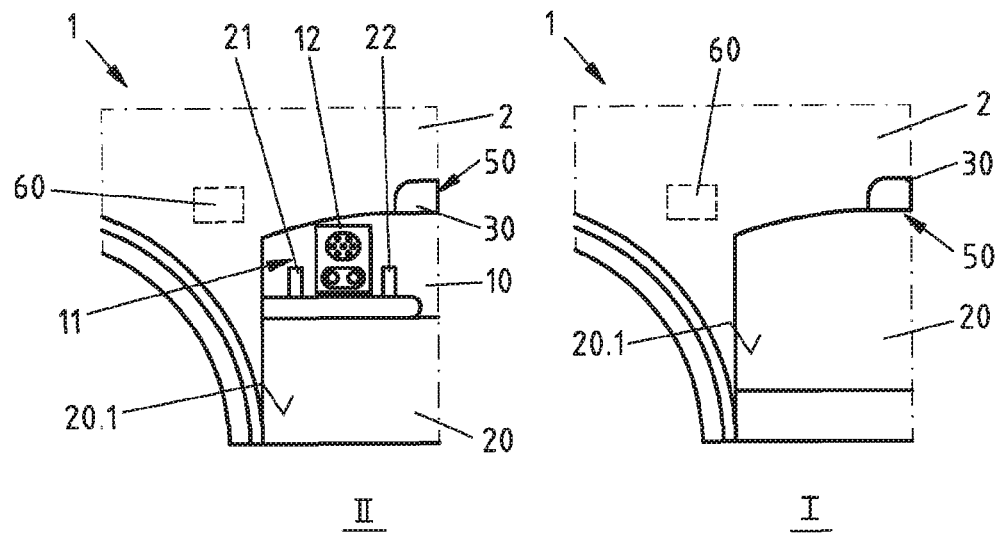
Figure 4:
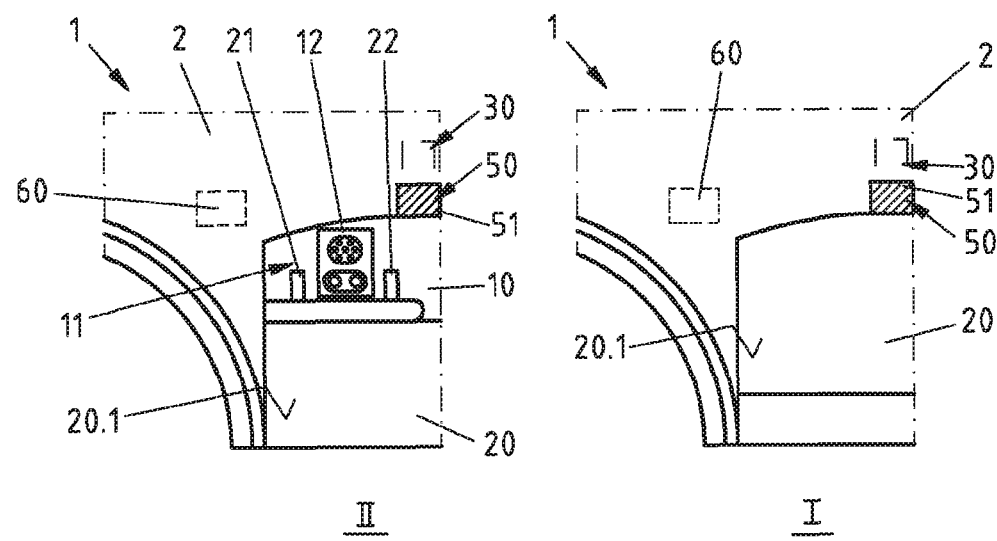

An actuating area 50 is provided on tank module 1, in which the activation action of the user can be detected on the protective element 20 (see FIGS. 1 and 2) and/or on a vehicle outer shell 2 (see FIGS. 3 and 4). On the actuating area 50, according to the configuration forms in FIG. 1 or 4, an identification 51, e.g. in the form of a structuring and/or a marking, can be provided in order to visually and/or hepatically highlight the actuating area 50 and thus make it recognizable for the user. Thus, the user comfort of the tank module 1 can be increased.

FIG. 1 shows the actuation area 50 in the form of an elastically deformable area 50 on the protective element 20, which lies above the sensor 30 in the rest position I of the protective element 20. The actuating area 50 can be made of a metal, e.g. aluminum or steel. Such an actuating area 50 shields electromagnetic waves. A pressure sensor 30, e.g. an LDC sensor 30, can be used in conjunction with such a metal actuating area 50, which is described below with the aid of FIGS. 5 to 10. Alternatively, it is conceivable that the actuating area 50 can be made of a plastic material. In conjunction with a plastic actuating area 50, the sensor 30 can be designed in different ways, such as an visual sensor, a capacitive sensor, a pressure sensor, an inductive sensor or an NFC sensor. To transfer the protective element 20 from the rest position I to the actuating position II, press 50 on the actuating area. To transfer protective element 20 from actuating position II to rest position I, press sensor 30.

FIG. 2 shows the actuation area 50 in the form of a recess 50 in the protective element 20, which is located above the sensor 30 in the rest position I of the protective element 20. In conjunction with such an actuation area of 50, the sensor 30 can be designed in different ways, such as an visual sensor, a capacitive sensor, a pressure sensor, an inductive sensor or an NFC sensor. To transfer the protective element 20 from the rest position I to the actuating position II and vice versa, the sensor 30 can be actuated.

FIG. 3 shows the actuating area 50 in the form of a recess 50 in the vehicle outer shell 2, which lies above the sensor 30 independently of the position I, II of the protective element 20. The sensor 30 can be configured in different ways, such as an visual sensor, a capacitive sensor, a pressure sensor, an inductive sensor or an NFC sensor. To transfer the protective element 20 from the rest position I to the actuating position II and vice versa, the sensor 30 can be actuated.

FIG. 4 shows the actuation area 50 in the form of an elastically deformable area 50 on a vehicle outer shell 2, which lies above or adjacent to the sensor 30 independently of the position I, II of the protective element 20. The actuating area 50 can be made of a metal. A pressure sensor 30, e.g. an LDC sensor 30, can be used in conjunction with such a metal actuating area 50, as described in FIGS. 5 to 10 below. Alternatively, it is conceivable that the actuating area 50 can be made of a plastic material. In combination with such a plastic actuating area 50, the sensor 30 can be designed in different ways, e.g. an visual sensor, a capacitive sensor, a pressure sensor, an inductive sensor or an NFC sensor. To transfer the protective element 20 from the rest position I to the actuating position II and vice versa, press actuating area 50.

Figure 5:
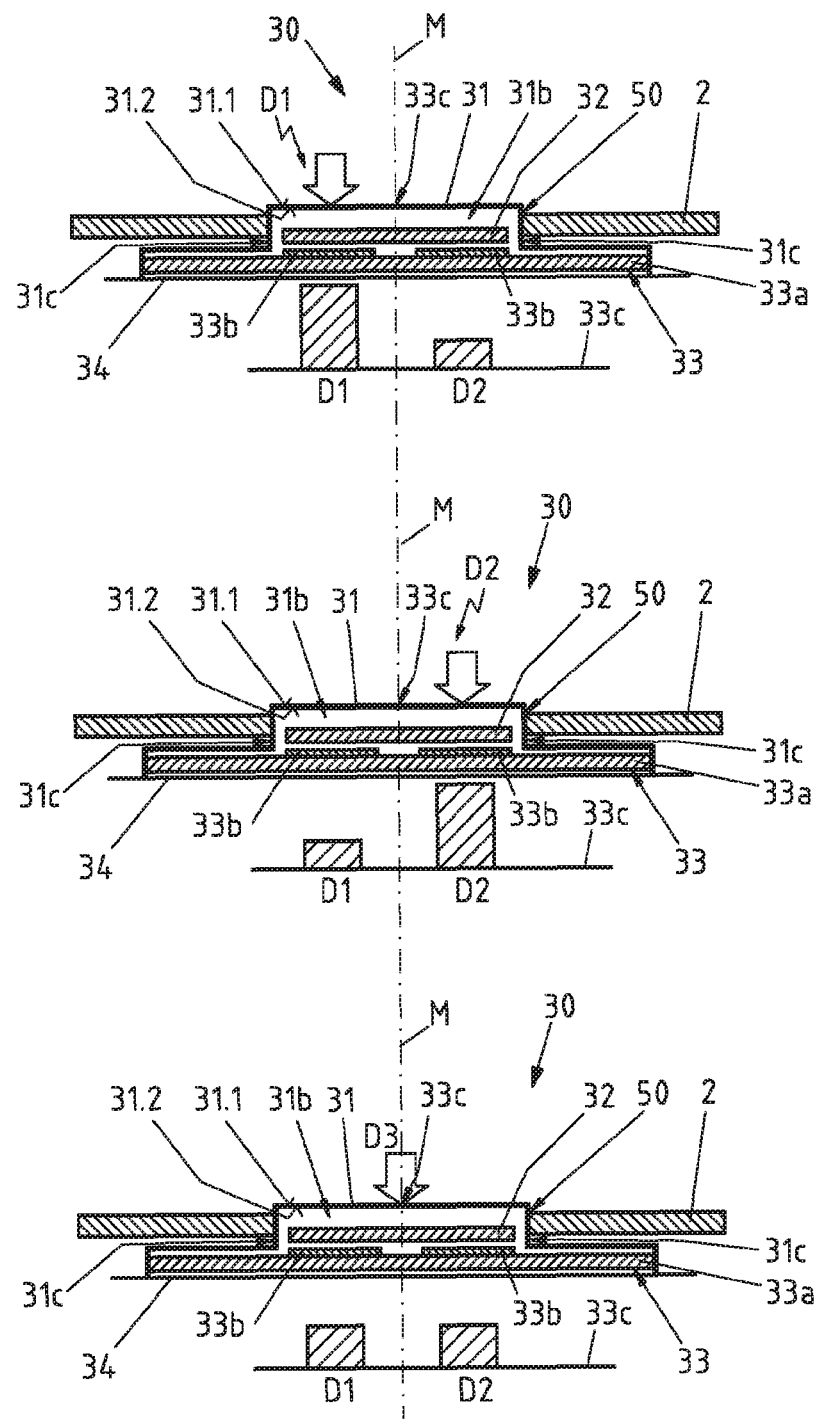
Figure 6:
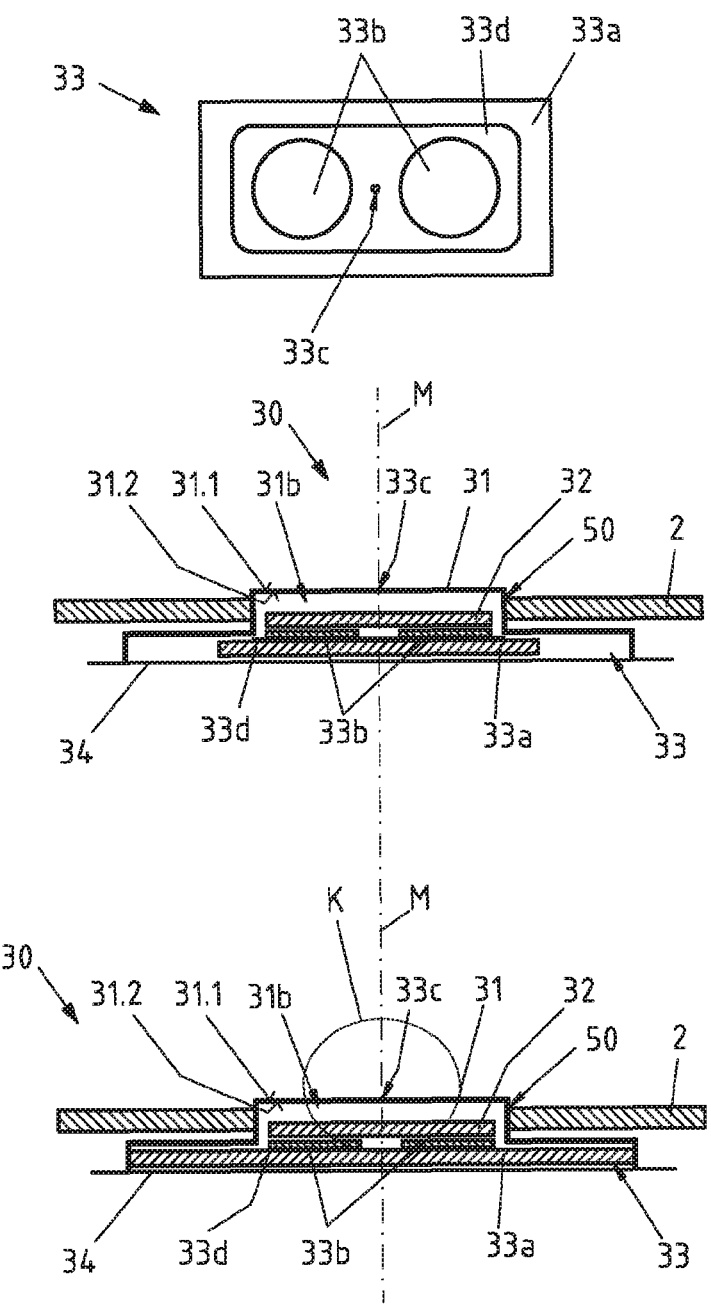

FIGS. 5 and 6 show a schematic representation of a sensor 30 in the form of an LDC sensor 30. Such a sensor 30 is inexpensive, can be precisely adjusted and can record small pressure values without contact. Resolutions below one micrometer with 16 bit resonance impedance and 24 bit inductance values are possible. The LDC Sensor 30 features improved reliability over contact pressure sensors, with non-contact sensing insensitive to non-conductive contaminants such as oil, dirt or dust that can affect the life of a contact sensor 30.

The sensor 30 comprises a deformation area 31 in the form of a cap 31, which in the configuration embodiment shown is arranged in a recess 50 as actuation area 50 on a vehicle outer shell 2 (cf. FIG. 3). Furthermore, it is conceivable that the deformation region 31 may be positioned below the elastically deformable region 50 as an actuating element 50, but nevertheless on the protective element 20 (cf. FIG. 1) or on the vehicle outer shell 2 (cf. FIG. 4). In addition, it is conceivable that the deformation area 31 can be arranged in a recess 50 on the protective element 20 (see FIG. 2).

On an outer side 31.1, the deformation area 31 may have a display element 31a, e.g. in the form of a manufacturer code, as indicated in FIG. 10 below. In addition, it is conceivable that the display element 31a can be designed to display information, e.g. operating instructions for correct operation of the sensor. Furthermore, it is conceivable that the display element 31a can be designed to display a correct detection point 33c. The detection point 33c is explained in the following with the help of FIGS. 5 and 6.

On an inner side 31.2 of the deformation area 31, a recess 31b is provided, which is bordered by a collar element 31c. Activation means 32 is arranged in recess 31b. Activation means 32 can be in the form of a metal film. Under activation agent 32, detection area 33 is provided with a circuit board 33a and two LDC sensor elements 33b, which is arranged on a mounting area 34. The LDC sensor elements 33b are arranged symmetrically around the detection point 33c, exactly in the middle M between the two LDC sensor elements 33b. The dotted line shows the middle M between the two LDC sensor elements 33b. The number of LDC sensor elements 33b equal to two is specified, for example. Furthermore, it is conceivable that only one LDC sensor element 33b can be provided. Several LDC sensor elements 33b are advantageous in order to achieve a more precise detection of a targeted actuation of sensor 30. It is conceivable that three or four LDC sensor elements 33b can be provided, as shown in FIGS. 8a to 8c. Precise actuation of sensor 30, exactly at detection point 33c, is advantageous to avoid false triggering of sensor 30.

The detection point 33c is selected such that the LDC sensor elements 33d in any version of FIGS. 5 to 10 are symmetrically distributed around the detection point 33c. The dotted line running through the center M between the LDC sensor elements 33d shows that the detection point 33c can be assigned a corresponding detection point 33c at the deformation area 31.

The sensor 30 works in an inductive way. The relative position or the distance of the activation medium 32 to the LDC sensor elements 33b can be changed by an even very small deformation of the deformation area 31. Activation means 32 is made of a conductive material. The LDC sensor elements 33b are designed in the form of flat spirals in which a magnetic field can be induced by changing the position or approaching the conductive activation element 32 to the respective LDC sensor element 33b. Whether the sensor 30 is actuated depends on the position of the pressure effect. As shown above or in the middle of FIG. 5, an even strong pressure D1 on the left or an even strong pressure D2 on the right has no effect on the deformation surface 31. Only a targeted pressure D3 in the detection point 33c, which is exactly in the middle M between the two LDC sensor elements 33b, can generate a sufficient and approximately equal pressure effect D1, D2 on the left LDC sensor element 33b as well as on the right LDC sensor element 33b to actuate the sensor 30. Thus, a faulty operation of the sensor 30, e.g. by washing brushes in a car wash or by a randomly approached object, can be reduced or even avoided.

FIG. 6 shows the sensor 30 schematically from above according to a further example, whereby in this example the sensor 30 can also have a capacitive area 33d on the circuit board 33a. The capacitive area 33d can generate a capacitive field K. With the capacitive area 33d an additional function can be realized, e.g. to detect an approach of a user or a user hand in a capacitive way. This function can, for example, precede an actuation of sensor 30 in order to switch on sensor 30 if necessary. Advantageously, two control mechanisms can thus be provided to distinguish a conscious activation action from a random actuation of the sensor 30.

Thus, it is advantageous to avoid faulty transfers of the protective element 20 from the rest position I to the actuating position II.

FIGS. 7a and 7b show another example of the invention according to which the sensor 30 can be provided at one bearing position 21 (see FIG. 7b) or at two bearing positions 21, 22 (see FIG. 7a) of the protective element 20.

FIG. 7a shows that the deformation area 31 can be provided at the bearing positions 21, 22 of the protective element 20. In addition, the sensor 30 has an activation agent 32 at each bearing position 21, 22 and a detection area 33 with a circuit board 33a and an LDC sensor element 33b around each bearing position 21, 22. The mounting area 34 can be formed on an inside of the vehicle outer shell 2. The sensor 30 can be actuated by applying a pressure D3 in the middle M between the bearing positions 21, 22.

FIG. 7b shows that it is basically possible to arrange the sensor 30 with a detection area of 33 at a bearing position 21 of the protective element 20.

As shown in FIGS. 7a and 7b, pressing D3 on protective element 20 can initiate both a transfer of protective element 20 from rest position I to actuating position II and from actuating position II to rest position I.

FIG. 8a shows a sensor 30 according to a design with four LDC sensor elements 33b arranged symmetrically around detection point 33c at detection area 33. The detection area 33 is arranged in the mounting area 34 with a recess 34b, whereby the recess 34b for the detection area 33 is surrounded by a rim element 34c. Mounting brackets 34a can be provided on the side of the mounting area 34 to attach the sensor 30 as a whole to the housing 10 of the tank module 1. Instead of fixing straps 34a, any fixing means can be provided which can enable the fixing area 34 to be detachably and/or non-detachably fixed with the housing 10.

FIG. 8b shows a sensor 30 according to a configuration with four LDC sensor elements 33b arranged in a row at the detection area 33. The detection point 33c lies exactly in the middle M between the LDC sensor elements 33b.

FIG. 8c shows a sensor 30 according to a configuration with three LDC sensor elements 33b, which can also be arranged symmetrically around the detection point 33c.

FIG. 9 shows how the sensor 30 can be assembled. The rim element 31c of the deformation region 31 and the rim element 34c of the fastening region 34 can be complementary to one another and, for example, have corresponding latching elements in order to fasten the deformation region 31 form and/or form fitting with the fastening region 34. Below the deformation area 31 the recess 31b for the activation agent 32 is formed and at the mounting area 34 the recess 34b for the detection area 33 is formed. In the recess 31b at the deformation area 31, fasteners or ram 31.3 are provided, whereby one fastener or ram 31.3 is provided for each LDC sensor element 33b. Each fastener or ram 31.3 can be equipped with a separate activator 32, e.g. in the form of a metal film. If the deformation area 31 is fixed with the mounting area 34, the activation agent 32 and the detection area 33 are protected from external influences inside the sensor 30. It is conceivable that the deformation area 31 and the mounting area 34 can be made of synthetic, e.g. plastic.

As shown in FIG. 9 above, a taper 31d can be provided in the recess 31b, laterally and adjacent to the rim element 31c, which can be in the form of a groove or notch on the circumferential side in the recess 31b. Taper 31d allows elastic, yielding deformation of the deformation area 31. The elastic deformation of the deformation area 31 can cause the activation element 32 to move relative to the detection area 33. Thus, the activation agent 32 can generate an inductive signal which can be detected in detection area 33.

As shown in the middle and bottom of FIG. 9, a folding element 31d can be provided in the recess 31b, laterally and adjacent to the collar element 31c, which can be designed as a thin-walled membrane in the form of a bellows. The folding element 31d can be produced with the deformation area 31 in an injection molding process, as shown in the middle of FIG. 9. Furthermore, it is conceivable that the folding element 31d and the deformation area 31 can be designed as a 2K component. It is conceivable that the folding element 31d may be made of an elastic material, e.g. plastic, preferably with a lower viscosity than the material of the deformation area 31. The folding element 31d can be used to deform the deformation area 31 in such a way that the activation element 32 can be moved relative to the detection area 33.

FIG. 10 shows that a display element 31a can be provided on an outer side 31.1 of the deformation area 31, which can, for example, indicate a manufacturer name and/or a manufacturer emblem in the form of a relief. Basically different visual and/or haptic display elements 31a are conceivable, which can display different information for the user, e.g. regarding the correct use of the sensor 30. Furthermore, it is conceivable that an unrepresented lighting element may be provided on sensor element 30 to illuminate display element 31a. Nevertheless, it is conceivable that a lighting element can be provided in the vicinity of actuating area 50 in order to make the actuating area 50 visible even in darkness.

Figure 11:
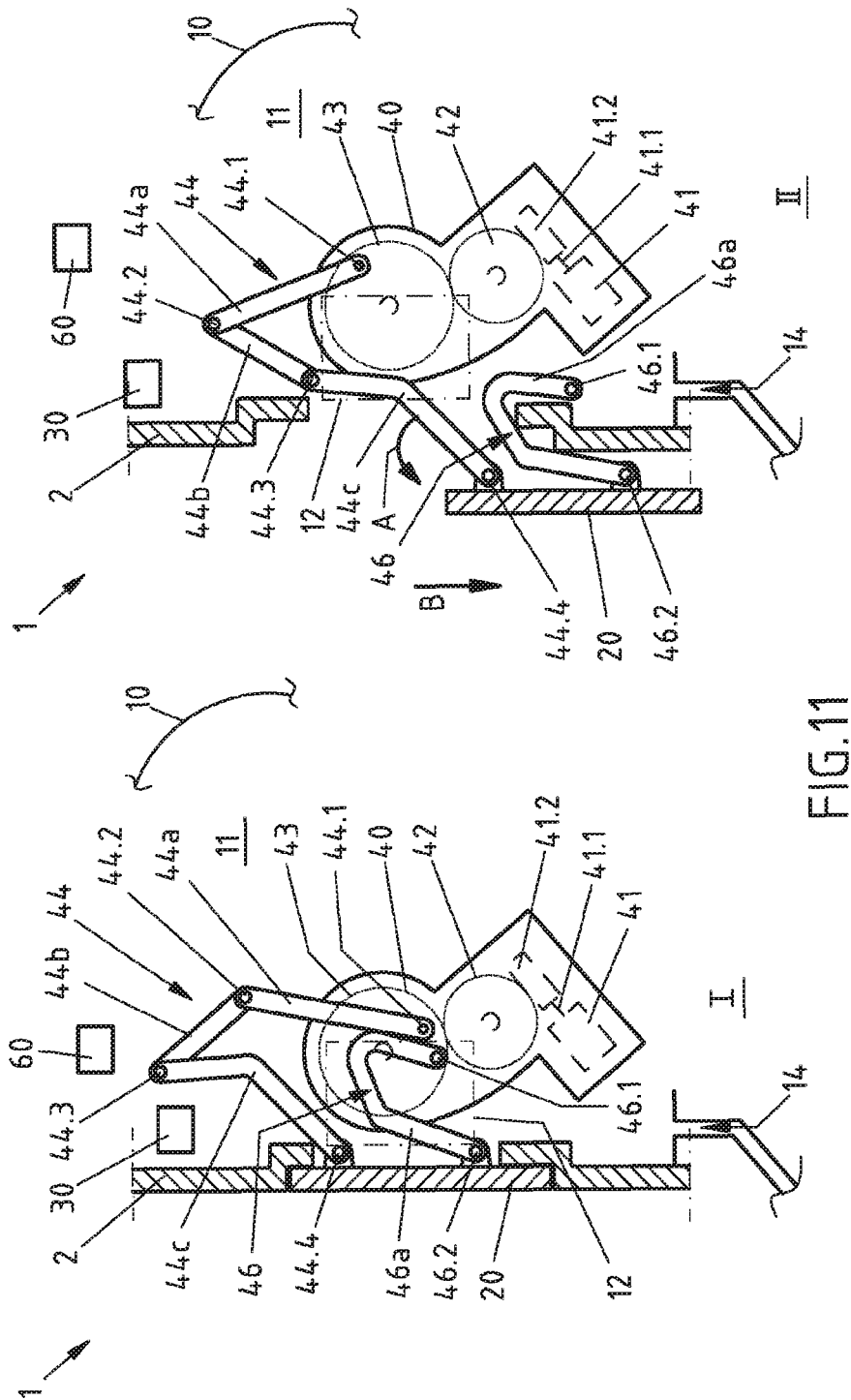
Figure 12:
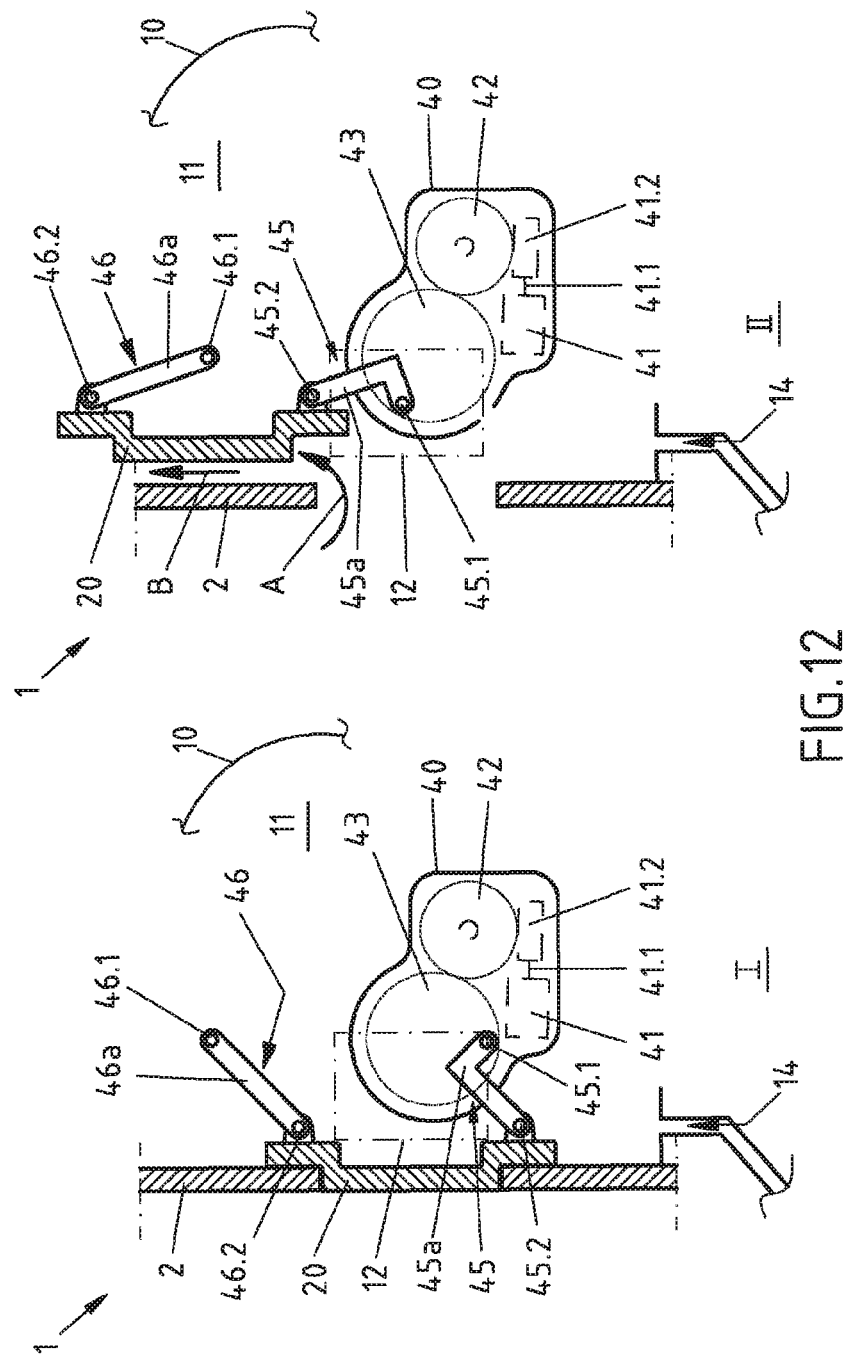

FIGS. 11 and 12 each show a possible drive device 40 for the protective element 20. The drive device 40 has a motor 41 and a drive shaft 41.1 with a worm 41.2. In addition, the drive device 40 comprises a gear 42, 43, which transmits the driving action from the motor 41 to the protective element 20. Worm wheel 42 can be rotated to worm 41.2 and a cog 43 which is connected to worm wheel 42. A self-locking gear 42, 43 can thus be provided to protect protective element 20 from manipulation, especially in actuating position II. By a suitable selection of the diameters of the worm gear 42 and the cog 43, a gear ratio, in particular a reduction ratio, can be provided to drive the protective element 20 stably over a relatively short working course.

According to a configuration of FIG. 11, the drive device 40 can have a lever mechanism 44 to transmit the drive action to the protective element 20. The lever mechanism 44 can be configured as a four-joint lever mechanism 44. The four-joint lever mechanism 44 has three levers 44a, 44b, 44c and four joints 44.1, 44.2, 44.3, 44.4 as rotatable axles. Thus a relatively flush transfer of the protective element 20 from the rest position I to the actuating position II can be made possible, whereby the protective element 20 is arranged in each position I, II between the rest position I and the actuating position II relatively close or flush to the vehicle outer shell 2, without however contacting the vehicle outer shell 2 directly. Thus, the protective element 20 can also be protected against manipulation during the transfer between the rest position I and the actuating position II.

The four-joint lever mechanism 44 as shown in FIG. 11 also enables for the protective element 20 to be moved outwards in a first phase of movement A during the movement between the rest position I and the actuating position II, in such a way that it can rotate outwards with respect to the housing 11 in the housing 10 and in a second phase of movement B essentially parallel to the outer shell 2 of the vehicle. The advantage of the first movement phase A is that the size of the tank module 1 can be reduced. The advantage of the second movement phase B is that the protective element 20 can essentially move parallel to the vehicle outer shell 2 without protruding dangerously far from the vehicle outer shell 2.

According to a configuration of FIG. 12, the drive device 40 may have a lever mechanism 45, which may have a crank 45a, which may be rotatably connected to the protective element 20 to drive the protective element 20. Thus, a simple lever mechanism 45 can be provided for the protective element 20. The crank 45a is connected to the cod 43 as a fixed joint 45.1 by means of a torsion-proof connection 45.1. Another end of the crank is rotatably connected to the protective element 20 via a joint 45.2. The lever mechanism 45 can be configured in such a way that the protective element 20 can be moved in a first movement phase A rotatably inwards into the recess 11 in the housing 10 during the movement between the rest position I and the actuating position II and in a second movement phase B substantially parallel to the vehicle outer shell 2 within the recess 11. This allows the advantage to be achieved that the protective element 20 in actuating position II can be arranged inaccessibly from the outside, protected inside the recess 11 behind the vehicle outer shell 2.

FIGS. 11 and 12 also show a second lever mechanism 46 configured to stabilize the movement of the protective element 20. The second lever mechanism 46 has a lever 46a which is pivotally mounted on the housing 10 and which is rotatably connected to the protective element 20. The second lever mechanism 46 has two joints 46.1, 46.2 as rotatable axes in order to connect the protective element 20 to the housing 10 so that it can swivel and rotate with the protective element 20. The lever 46a can at least partially determine the movement of the protective element 20 and advantageously prevent the protective element 20 from being dangerously far away from the vehicle outer shell 2 during the movement between the rest position I and the actuating position II.

In the configuration of FIG. 11, the lever 46a can be configured as an arcuate lever 46a to allow movement of the protective element 20 around an edge of the housing 10 at the edge of the recess 11 without colliding with the edge.

Furthermore, FIGS. 11 and 12 show that a drain 14 can be provided in housing 10 to drain moisture, e.g. rainwater, from housing 11 of housing 10. The outlet 14 can lead to the outside.

Figure 13:
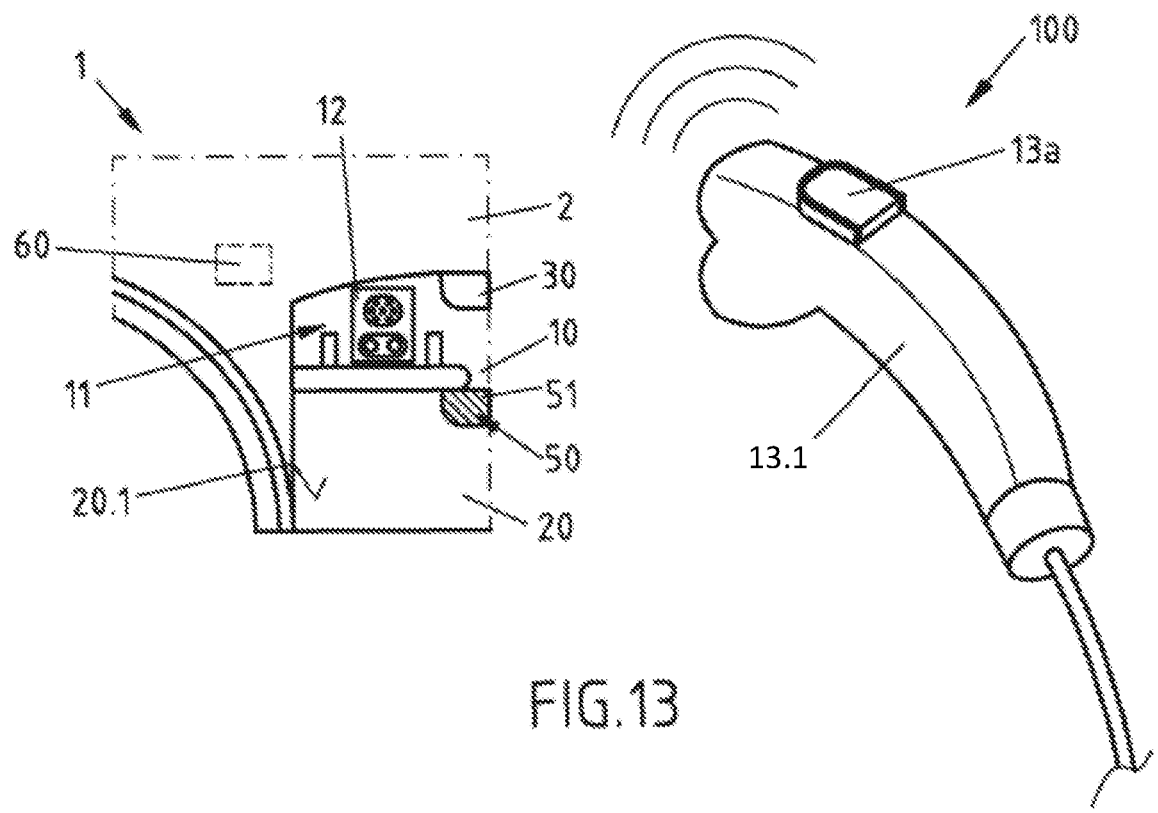
Figure 14:
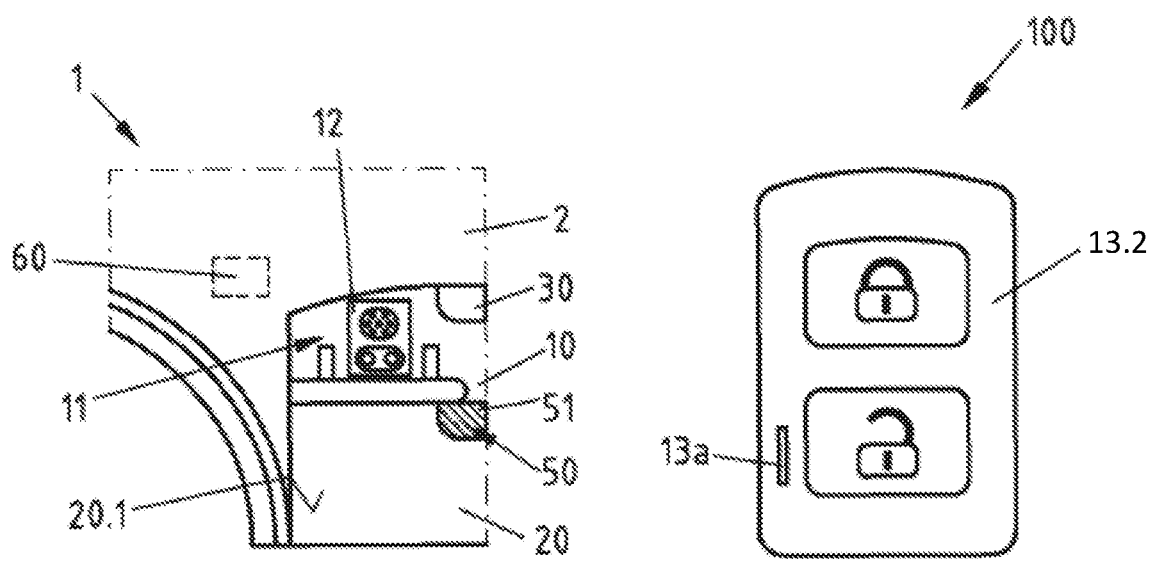

FIGS. 13 and 14 show the inventive System 100, each in a possible configuration. The System 100 has a tank module 1, which can be executed according to one of the configuration embodiments described above. Furthermore, the System 100 has a mobile component 13, which is equipped with an activation element 13a. The activation element 13a can either interact with the sensor 30 or with the other sensor 60 to drive the protective element 20 without contact or to initiate another function, such as cashless payment and/or an ID query.

The system 100 according to the invention is an intelligent, interactive system 100 with a tank module 1 and a mobile component 13. A charging plug 13.1 (see FIG. 13) for the connection element 12 and/or an ID transponder 13.2 (see FIG. 14) are conceivable as a mobile component 13. It is also conceivable that an additional sensor 60 can be provided on tank module 1 for an activation element 13a on the charging plug 13.1 and an activation element 13a on the ID transponder 13.2, whereby the sensor 30 can only be provided for actuating the protective element 20. Nevertheless, it is conceivable that the activation element 13a at the charging plug 13 and/or the activation element 13a at the ID transponder can interact with the sensor 30, e.g. in a contactless manner.

According to FIG. 13, it is also conceivable that the activation element 13a at the charging plug 13.1 can be configured as an NFC tag. The NFC tag can interact over an area of 0 to 5 cm, preferably an area of 0 to 2 cm, or particularly safely with the sensor 30 or the additional sensor 60. Payment processes can be initiated via the NFC tag. The NFC tag can be either an active or a passive transponder. For this purpose the sensor 30, 60 can be configured as an active and/or passive transponder.

REFERENCE CHARACTER LIST

1 tank module
2 vehicle outer shell
10 housing
11 admission
12 connection element/charging socket
13 mobile component/charging plug/ID transponder
13a activation element/sensor element/antenna
14 drain
20 protective element
20.1 outer surface
21 bearing position
22 bearing position
30 sensor
31 deformation area/cap
31.1 outer side
31.2 inner side
31.3 fasteners/ram
31a display element/emblem
31b recess
31c collar element
31d folding element/taper
32 activation means
33 detection area
33a platine/capacitive area
33b IDC sensor elements
33c detection point
33d capacitive area
34 fastening area
34a mounting brackets
34b recess
34c rim element
40 drive device
41 motor
41.1 drive shaft
41.2 worm
42, 43 gear units 42 worm wheel
43 cod
44 lever mechanism
44.1 joint
44.2 joint
44.3 joint
44.4 joint
44a lever
44b lever
44c lever
lever mechanism
45.1 joint
45.2 joint
45a lever
46 second lever mechanism
46.1 joint
46.2 joint 46a lever
50 actuating area/recess/elastically deformable area
51 recognition
60 second sensor
A first movement phase
B second movement phase
D1 pressure
D2 pressure
D3 pressure
K capacitive field
M center
I resting position
II actuating position

The invention claimed is:

1. A tank module for a motor vehicle, with a housing in which a recess is provided,
wherein a connecting element is arranged in the recess,
a protective element for the connecting element, which can be moved between at least two positions, namely:
a rest position in which the recess can be closed by the protective element, and
an operating position in which the recess can be released by the protective element so that the connecting element is exposed,
the protective element having an outer surface,
and at least one sensor for detecting an activation action of a user to transfer the protective element between the rest position and the operating position,
wherein
the protective element is mounted in such a way that the outer surface of the protective element in the rest position and the outer surface of the protective element in the operating position are aligned parallel to one another,
wherein a drive device has a lever mechanism for transmitting a driving action to the protective element,
wherein the lever mechanism is designed as a four-joint lever mechanism in such a way that, during movement between the rest position and the operating position in a first movement phase, the protective element is moved rotatably outwards with respect to the recess in the housing and in a second movement phase, the protective element is moved substantially parallel to a vehicle outer shell,
or wherein the lever mechanism comprises a crank rotatably connected to the protective element for driving the protective element so that the protective element is moved during movement between the rest position and the operating position in a first movement phase rotatably inwards into the recess in the housing and in a second movement phase substantially parallel to the vehicle outer shell, and
wherein the drive device comprises a second lever mechanism for stabilizing the movement of the protective element.

2. The tank module according to claim 1,
wherein
an actuating area is provided in which the activation action of the user can be detected on at least the protective element or on the vehicle outer shell.

3. The tank module according to claim 2,
wherein
the actuating area can be configured in the form of a recess in the protective element or in the vehicle outer shell, or in that the actuating area can be formed from plastic.

4. The tank module according to claim 2,
wherein
the actuating area is in the form of an elastically deformable area in the protective element or in the vehicle outer shell.

5. The tank module according to claim 2,
wherein
the sensor has a deformation area, at which the activation action of the user can be detected by deforming at least the deformation area or the actuating area and the deformation area.

6. The tank module according to claim 5,
wherein
the deformation area has at least a visual or haptic display element on an outer side of the deformation area facing the actuating area.

7. The tank module according to claim 1,
wherein
the sensor has at least one activator.

8. The tank module according to claim 5,
wherein
the deformation area has a recess for at least one activator on an inner side facing away from the actuating area.

9. The tank module according to claim 5,
wherein
the deformation area has a fastener, for at least one activator, on an inner side facing away from the actuating area, in order to fasten the at least one activator to the deformation area in at least a form-, force- or material-locking manner.

10. The tank module according to claim 1,
wherein
the sensor has a detection area in which a deformation of at least the actuating area or of the deformation area can be detected.

11. The tank module according to claim 10,
wherein
the detection area comprises at least one circuit board or at least one LDC sensor element.

12. The tank module according to claim 1,
wherein
the sensor has a fastening area for fastening the sensor to the housing.

13. The tank module according to claim 5,
wherein
a collar element on the deformation area and a rim element on a fastening area are at least complementary to one another or can be fastened to one another in at least a form- or force-locking manner, so that at least one activator and a detection area can be arranged protected between the deformation area and the fastening area.

14. The tank module according to claim 1,
wherein
a further sensor is provided.

15. The tank module according to claim 1,
wherein
a drive device is provided for the protective element,
the drive device comprising at least a motor or a gear, in order to provide the driving action for the protective element.

16. A system having a tank module for a motor vehicle, the tank module being equipped with
a housing in which a recess is provided,
wherein a connecting element is arranged in the recess,
a protective element for the connecting element, which can be moved between at least two positions, namely:

a rest position in which the recess can be closed by the protective element, and an operating position in which the recess can be released by the protective element so that the connecting element is exposed, the protective element having an outer surface, and at least one sensor for detecting an activation action of a user to transfer the protective element between the rest position and the operating position, wherein the protective element is mounted in such a way that the outer surface of the protective element in the rest position and the outer surface of the protective element in the operating position are aligned parallel to one another, and a mobile component, the mobile component having an activation element which interacts at least with the sensor or a further sensor in order to drive the protective element without contact or to initiate a function, wherein a drive device has a lever mechanism for transmitting a driving action to the protective element, wherein the lever mechanism is designed as a four-joint lever mechanism in such a way that, during movement between the rest position and the operating position in a first movement phase, the protective element is moved rotatably outwards with respect to the recess in the housing and in a second movement phase, the protective element is moved substantially parallel to a vehicle outer shell, or wherein the lever mechanism comprises a crank rotatably connected to the protective element for driving the protective element so that the protective element is moved during movement between the rest position and the operating position in a first movement phase rotatably inwards into the recess in the housing and in a second movement phase substantially parallel to the vehicle outer shell, and wherein the drive device comprises a second lever mechanism for stabilizing the movement of the protective element.

17. The system according to claim 16, wherein the mobile component is at least a charging plug or an ID transponder.

18. A method for actuating a tank module for a motor vehicle, with a housing in which a recess is provided, wherein a connecting element is arranged in the recess, a protective element for the connecting element, which can be moved between at least two positions, namely:

a rest position in which the recess can be closed by the protective element, and an operating position in which the recess can be released by the protective element so that the connecting element is exposed, the protective element having an outer surface, and at least one sensor for detecting an activation action of a user to transfer the protective element between the rest position and the operating position, wherein the protective element is driven in such a way that the outer surface of the protective element in the rest position and the outer surface of the protective element in the operating position are aligned parallel to one another, wherein a drive device has a lever mechanism for transmitting a driving action to the protective element, wherein the lever mechanism is designed as a four-joint lever mechanism in such a way that, during movement between the rest position and the operating position in a first movement phase, the protective element is moved rotatably outwards with respect to the recess in the housing and in a second movement phase, the protective element is moved substantially parallel to a vehicle outer shell, or wherein the lever mechanism comprises a crank rotatably connected to the protective element for driving the protective element so that the protective element is moved during movement between the rest position and the operating position in a first movement phase rotatably inwards into the recess in the housing and in a second movement phase substantially parallel to the vehicle outer shell, and wherein the drive device comprises a second lever mechanism for stabilizing the movement of the protective element.

19. The tank module according to claim 7, wherein the deformation area has a recess for the at least one activator on an inner side facing away from the actuating area.

20. The tank module according to claim 7, wherein the deformation area has a fastener, for the at least one activator, on an inner side facing away from the actuating area, in order to fasten the at least one activator to the deformation area in at least a form-, force- or material-locking manner.

21. The tank module according to claim 7, wherein a collar element on a deformation area and a rim element on a fastening area are at least complementary to one another or can be fastened to one another in at least a form- or force-locking manner, so that the at least one activator and a detection area can be arranged protected between the deformation area and the fastening area.

22. The tank module according to claim 12, wherein a collar element on a deformation area and a rim element on the fastening area are at least complementary to one another or can be fastened to one another in at least a form- or force-locking manner, so that at least one activator and a detection area can be arranged protected between the deformation area and the fastening area.

* * * * *